(12) United States Patent
Branigan et al.

(10) Patent No.: US 7,538,676 B2
(45) Date of Patent: May 26, 2009

(54) SYSTEM AND METHOD FOR SWAPPING TAG READS BASED ON STATISTICAL ANALYSIS OF KNOWN ENVIRONMENT

(75) Inventors: James Peter Branigan, Apex, NC (US); Angela Susan Graveline, Durham, NC (US); Lisa M. Pring, Yorktown, NY (US); Gregory Covert Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 11/422,537

(22) Filed: Jun. 6, 2006

(65) Prior Publication Data

US 2007/0279224 A1  Dec. 6, 2007

(51) Int. Cl.
*G08B 13/14* (2006.01)
(52) U.S. Cl. .................. 340/572.1; 340/10.1
(58) Field of Classification Search .......... 340/572.1, 340/10.1–10.2; 705/28; 235/385
See application file for complete search history.

(56) References Cited

U.S. PATENT DOCUMENTS

| 5,986,570 | A | 11/1999 | Black et al. ............ 340/825.54 |
| 6,286,762 | B1 | 9/2001 | Reynolds et al. ........ 235/472.01 |
| 6,318,636 | B1 | 11/2001 | Reynolds et al. ........ 235/472.01 |
| 2002/0089434 | A1* | 7/2002 | Ghazarian .................. 340/988 |
| 2004/0000585 | A1 | 1/2004 | Silverbrook et al. ........ 235/383 |
| 2004/0181461 | A1 | 9/2004 | Raiyani et al. ................ 705/26 |
| 2004/0263319 | A1 | 12/2004 | Huomo ...................... 340/10.2 |
| 2005/0029350 | A1 | 2/2005 | Jusas et al. .................. 235/451 |
| 2006/0036485 | A1 | 2/2006 | Duri et al. ...................... 705/14 |
| 2006/0080819 | A1 | 4/2006 | McAllister ................. 29/403.3 |

FOREIGN PATENT DOCUMENTS

| WO | WO2004023388 A2 | 3/2004 |
| WO | WO2004029652 A1 | 4/2004 |
| WO | WO2005022443 A2 | 3/2005 |
| WO | WO2005024595 A2 | 3/2005 |
| WO | WO2005046559 A2 | 5/2005 |

OTHER PUBLICATIONS

Office action mailed Dec. 9, 2008 for U.S. Appl. No. 11/422,548, 11 pages.

* cited by examiner

*Primary Examiner*—Daniel Wu
*Assistant Examiner*—Shirley Lu
(74) *Attorney, Agent, or Firm*—VanLeeuwen & VanLeeuwen (57) ABSTRACT

A radio frequency IC tag is provided which is excellent in weatherability, dustproofness, waterproofness, and static protection and capable of making a communication distance long even though each antenna section is made small in configuration. A first antenna equipped with an IC chip is formed on an upper surface of a first spacer. A second antenna is formed on a lower surface of a top cover. A second spacer is shaped in hollow form. The first spacer and the top cover are disposed on both sides of the second spacer with the first antenna and the second antenna being opposite to each other. Each of the first spacer, the second spacer and the top cover is formed of a synthetic resin. Thus, the IC chip and each antenna section are not exposed to the outside and hence weatherability is enhanced.

3 Claims, 8 Drawing Sheets

SYSTEM AND METHOD FOR SWAPPING TAG READS BASED ON STATISTICAL ANALYSIS OF KNOWN ENVIRONMENT

BACKGROUND OF THE INVENTION

1. Technical Field

The present invention relates in general to a system and method for swapping Radio Frequency Identification (RFID) tag data read at portals, such as dock doors. In particular, the present invention relates to a system and method to manage cross reads without use of physical shielding traditionally used to isolate RFID readers from one another.

2. Description of the Related Art

Radio Frequency Identifiers (RFID) is a means of identifying a unique object that has been tagged with a physical RFID tag by using a radio frequency transmission. Data stored in the RFID tags (also called transponders) is wirelessly transmitted to readers (also called interrogators) in an automated fashion. RFID readers can be stationary or portable, such as handheld readers. One example of a stationary reader is a reader that is installed proximate to loading dock doors to read tags from objects being moved through the dock doors.

RFID tags are affixed to objects. Each RFID tag includes an embedded microchip where information about the object is stored. RFID tags are typically powered by a radio frequency signal sent by the RFID reader. In response to receiving the radio frequency signal, the RFID tag responds by transmitting the identification data stored on the RFID tag. The radio frequency signals received by the RFID tags may be sent over a range of distances. When many objects are in proximity to a RFID reader, each of the RFID tags that receives the radio frequency signal responds by transmitting the data encoded on the RFID tag.

For example, assume 1,000 RFID-tagged objects are in proximity to an RFID reader that sends a radio frequency signal. Because of positioning of the objects, only 500 of the RFID-tagged objects receive the radio frequency signal, then these 500 RFID tags would transmit identification data back to the RFID reader. Each time the RFID reader sends the radio frequency signal, all of the RFID tags that receives the signal responds by transmitting the RFID data irregardless of whether the RFID tags have already been read. Assume that, in our example, the objects are being moved past the reader that periodically sends out the radio frequency signal. As objects are repositioned, some tags that did not originally receive the signal now receive the signal due to their new position in proximity to the RFID reader. Some objects, such as metal or aluminum cans filled with liquid (e.g., soda cans), may act as an insulator that prevents some of the RFID tags from receiving the radio frequency signal even while when the objects are moved. Other tags may not be able to be read because they are surrounded by too many other objects, such as a tag in the middle of a pallet.

As used herein, a pallet is a portable container, or platform, used for storing and moving objects, such as cargo or freight. Pallets are often used to store and move case goods. The cases and other objects stored on an individual pallet may be all of the same type (e.g., a pallet that only has boxes (cases) of oranges) or may have cases or objects of different types (e.g., a pallet that has some cases of oranges, some cases of apples, etc.). A pallet identifier is an RFID tag that uniquely identifies a particular pallet of goods. Each of the cases or objects included in the pallet is also uniquely identified. Using the examples from above, in the first example, a unique pallet identifier would be affixed somewhere on the pallet and each of the cases of oranges would also have RFID tags that uniquely identify each of the cases. Likewise, in the mixed-case example, a unique pallet identifier would be affixed somewhere on the pallet and each of the cases of oranges, apples, etc., would also have RFID tags affixed that uniquely identify the various objects (cases) included in the pallet.

In modern distribution settings, when goods are shipped the distributor (shipper) sends an electronic manifest to the customer (receiver). The electronic manifest details the pallet identifiers as well as the case level identifiers. When the customer receives the shipment, the customer's RFID readers read the tags on the pallets and cases and compares the tags that were read with the data included in the electronic manifest.

A challenge encountered when receiving goods by a receiver that has more than one RFID reader is cross reads. A cross read occurs when one RFID reader sends a radio frequency signal to read the RFID tags and receives additional RFID tag information for RFID tags that are being processed by a different RFID reader. For example, a receiver may have multiple dock doors for receiving goods offloaded by semi-trucks, freight trains, or other cargo transporters. When an RFID reader installed at one dock door sends the radio frequency signal, RFID tags affixed to goods that are arriving at a different dock door (and, thus, a different RFID reader) will also transmit their data if they receive the radio frequency signal. This is especially problematic when RFID readers are close to one another, such as those at adjacent dock doors. One approach to this challenge is to install shielding, typically metal, to isolate RFID readers from each other. One problem with this approach is that such shielding is often large and expensive. Another problem is that some cross-reads may still occur based on the proximity of the goods in relation to the RFID reader.

What is needed, therefore, is a system and method that identifies RFID tags destined for another RFID reader without the need for physically shielding the RFID readers from one another. Furthermore, what is needed is a system and method where data read at one RFID reader is transmitted to other RFID readers.

SUMMARY

It has been discovered that the aforementioned challenges are resolved using a system, method, and program product that identifies radio frequency identifier (RFID) tags destined for another RFID reader without the need for physically shielding the RFID readers from one another. When a shipment is unloaded, RFID tags affixed to pallets and goods being received are read by a first RFID reader at a first portal, such as a loading dock. The RFID tags uniquely identify each pallet or item. The tags that are read are compared with expected tag information that is included in a manifest sent from the shipper to the receiver. When cross-reads occur, RFID tags are read by other RFID readers. For example, in a loading dock, an RFID reader that reads RFID tags for a first loading dock (portal) may cross-read RFID tags being unloaded at a nearby loading dock. Based on comparing the RFID tags that are received with the manifest, the system determines whether the RFID tags are being unloaded at a different portal (e.g., at a nearby loading dock). When such items are identified, the first portal transmits the RFID tag information to the other portal(s).

In addition, the system may determine that some items are not supposed to be unloaded (e.g., they should remain on the truck or cargo carrier for delivery at another destination). An initial read takes place prior to unloading items. This initial read might spot RFID tags for pallets that should not be unloaded. When the shipment is unloaded, the system can determine whether a pallet that should not be unloaded is being unloaded based upon the RFID tags that are read. If such a pallet is unloaded, a warning message is conveyed to the operator so that corrective action can be taken and the pallet can be reloaded on the delivery vehicle.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
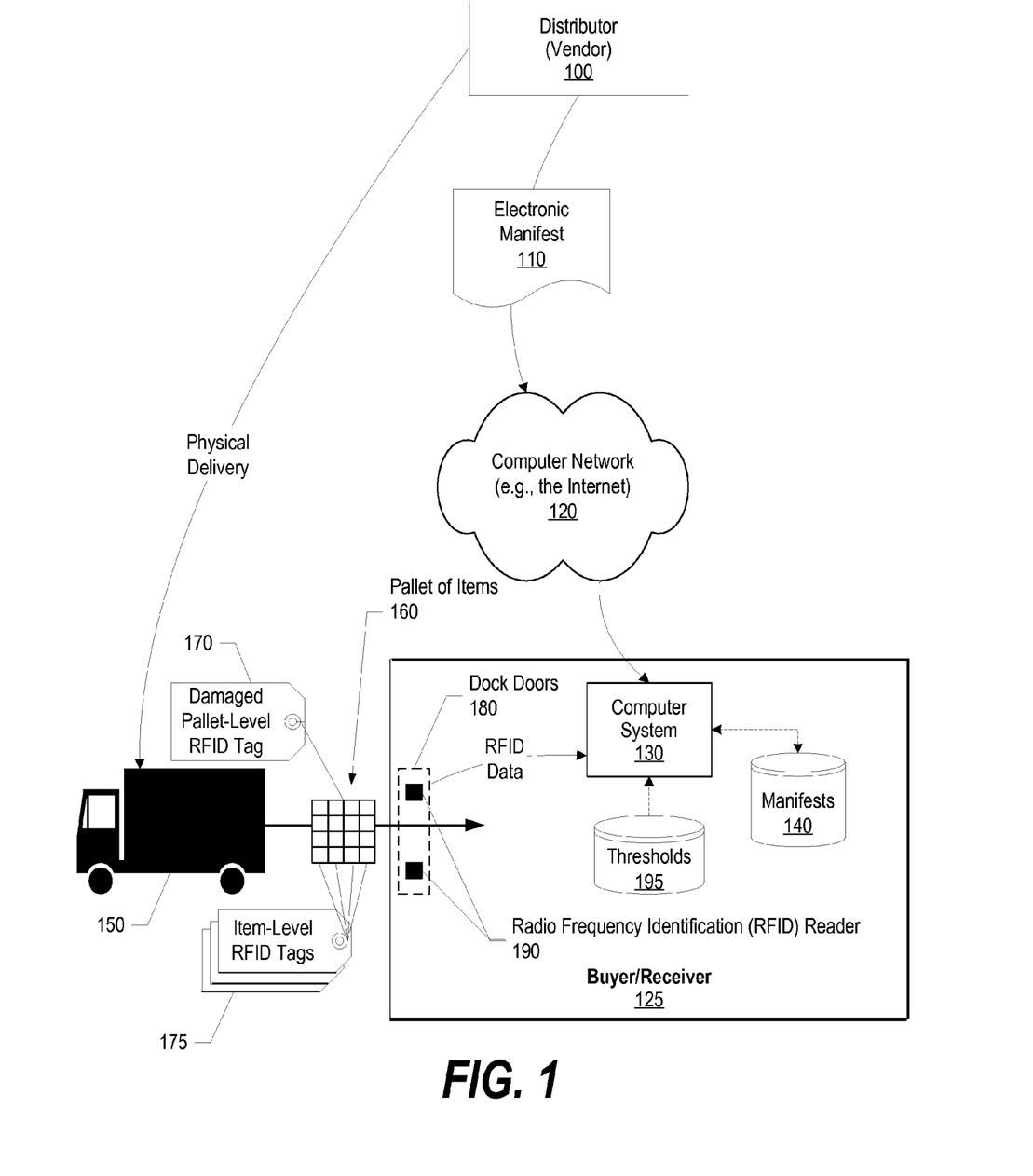
FIG. 1 is a block diagram showing a modern distribution scheme using electronic manifests and RFID tags and readers.

FIG. 1 is a block diagram showing a modern distribution scheme using electronic manifests and RFID tags and readers. Distributor 100, such as a shipper, seller, distributor or other sender, sends electronic manifest 110 through network 120 to buyer/receiver 125. The manifest can be transmitted long before the actual goods are shipped and details the goods that are shipped including the radio frequency identifier (RFID) tags that have been affixed to the pallets (pallet-level RFID tags) and individual goods (item-level RFID tags). The network can be a large publicly accessible network, such as the Internet or the PSTN (using modems to send and receive the data), or can be a private network linking the distributor with the buyer/receiver.

Buyer/receiver 125 receives the electronic manifest using computer system 130 and stores the manifests in data store 140. Some time after the manifest has been received, physical delivery of the goods takes place. Freight-carrying vehicle 150, such as a truck, train, airplane, etc., arrives at the buyer/distributor's dock doors 180 with one or more pallets of goods. In FIG. 1, pallet 160 arrives with a damaged (or missing) pallet-level tag 170. Pallet 160 also includes a number of individual items, such as individual cases, with each item having its own RFID tag (item-level tags). When goods pass through dock doors 180, they also pass through radio frequency identification (RFID) reader 190 that reads the pallet-level and item-level RFID tags. This data is processed by computer system 130 which then compares the pallet- and item-level RFID tags that are received with those that were included in electronic manifest 110 and stored in data store 140.

When a pallet-level tag is not read, computer system 130 reads (or computes) threshold data 195 to determine the number of individual items that need to be read to trigger assumed acceptance of the pallet. If the threshold is reached, the computer system marks the pallet as being received even though the pallet-level RFID tag was missing or damaged.

Figure 2A:
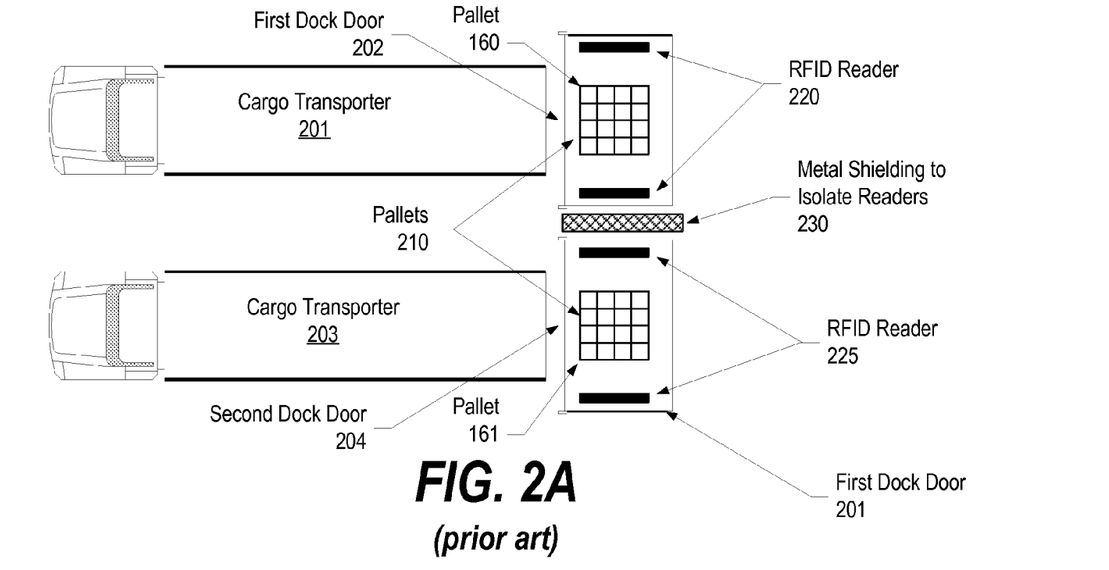
FIG. 2A is a prior art diagram showing dock doors with RFID readers isolated using metal shielding.

FIG. 2A is a prior art diagram showing dock doors with RFID readers isolated using metal shielding. RFID readers 220 and 225 read RFID tags that are in proximity to the readers. Cargo transporters 201 and 203 arrive and dock doors 202 and 204, respectively, and unload pallets of goods (pallet 160 being unloaded at dock door 202 and pallet 161 being unloaded at dock door 204). Each pallet is affixed with a pallet-level RFID tag and individual items on the pallets are affixed with item-level RFID tags. The pallet- and item-level RFID tags function alike, however the data encoded on the pallet-level RFID tag describes the content of the pallet while the item-level RFID tags describe the individual items. As pointed out in the Background section, the RFID readers (220 and 225) are intended to read the items at their respective dock doors. However, the RFID readers read any RFID tag within a given proximity to the readers. Consequently, RFID reader 220 reads RFID tags on pallet 160 as well as some of the RFID tags on pallet 161. Similarly, RFID reader 225 reads RFID tags on pallet 161 as well as some of the RFID tags on pallet 160. As used herein, "cross-read" refers to reading RFID tags on a pallet intended for a different RFID reader. Cross-reads can cause confusion as the system reading the RFID tags and the human operators performing the unloading operations may think that different goods are being unloaded at a given dock door. As used herein, an area where goods arrive and RFID tags are read, such as a dock door equipped with an RFID reader, is referred to as a "portal." In the prior art, attempts were made to isolate portals from one another using metal shielding 230. Challenges of using metal shielding is that it is expensive to install, restricts some movement through the receiving area, and takes up valuable space in the receiving area. In addition, while metal shielding may greatly reduce the number of cross-reads, some cross reads can still occur when RFID tags from neighboring pallets are not blocked by the shielding.

Figure 2B:
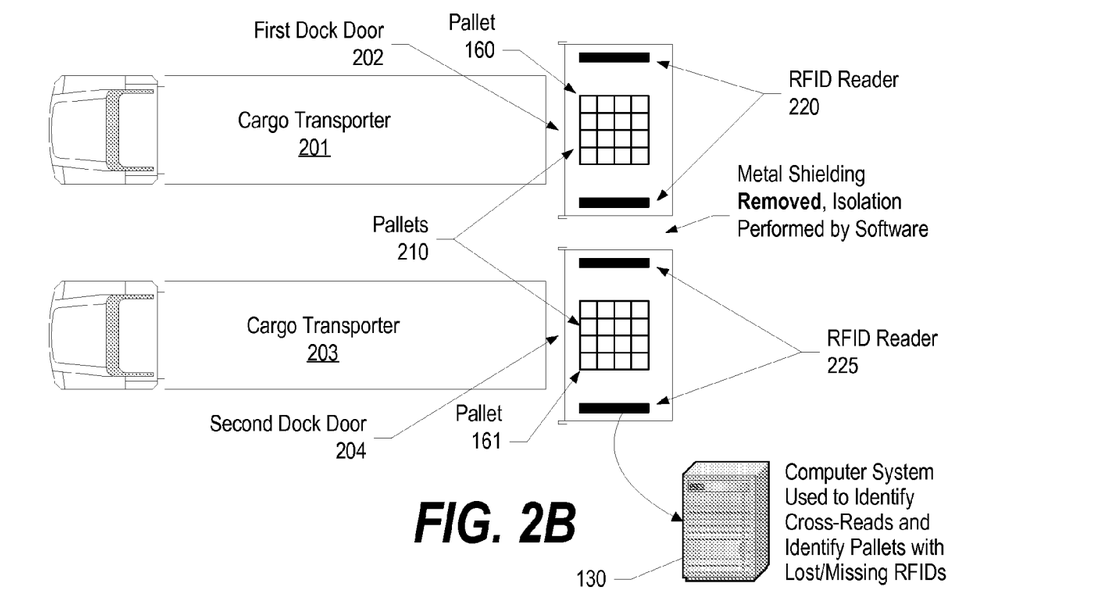
FIG. 2B is a diagram showing dock doors with RFID readers without using metal shielding and isolating cross-read RFID tags using a software application.

FIG. 2B is a diagram showing dock doors with RFID readers without using metal shielding and isolating cross-read RFID tags using a software application. In FIG. 2B, the metal shielding has been removed, eliminating the cost of the shielding and freeing up floor space. With the metal shielding removed, both RFID readers 220 and 225 will receive many cross-reads from RFID tags affixed to pallets and items in neighboring portals. However, computer system 130 executes a software application to filter out cross-reads and provide the cross-read data to the other portal(s). Sometimes an RFID tag intended for one portal is not read by the intended RFID reader but is read by a neighboring RFID reader. This is often because of the positioning of the items on the pallet. Using the shielding shown in FIG. 2A would prevent the RFID tag from being read by the neighboring RFID reader. However, with the shielding removed, the neighboring unit can read the RFID tag data and computer system 130 can send the data to the correct software process (or data area) for processing the data.

Figure 3:
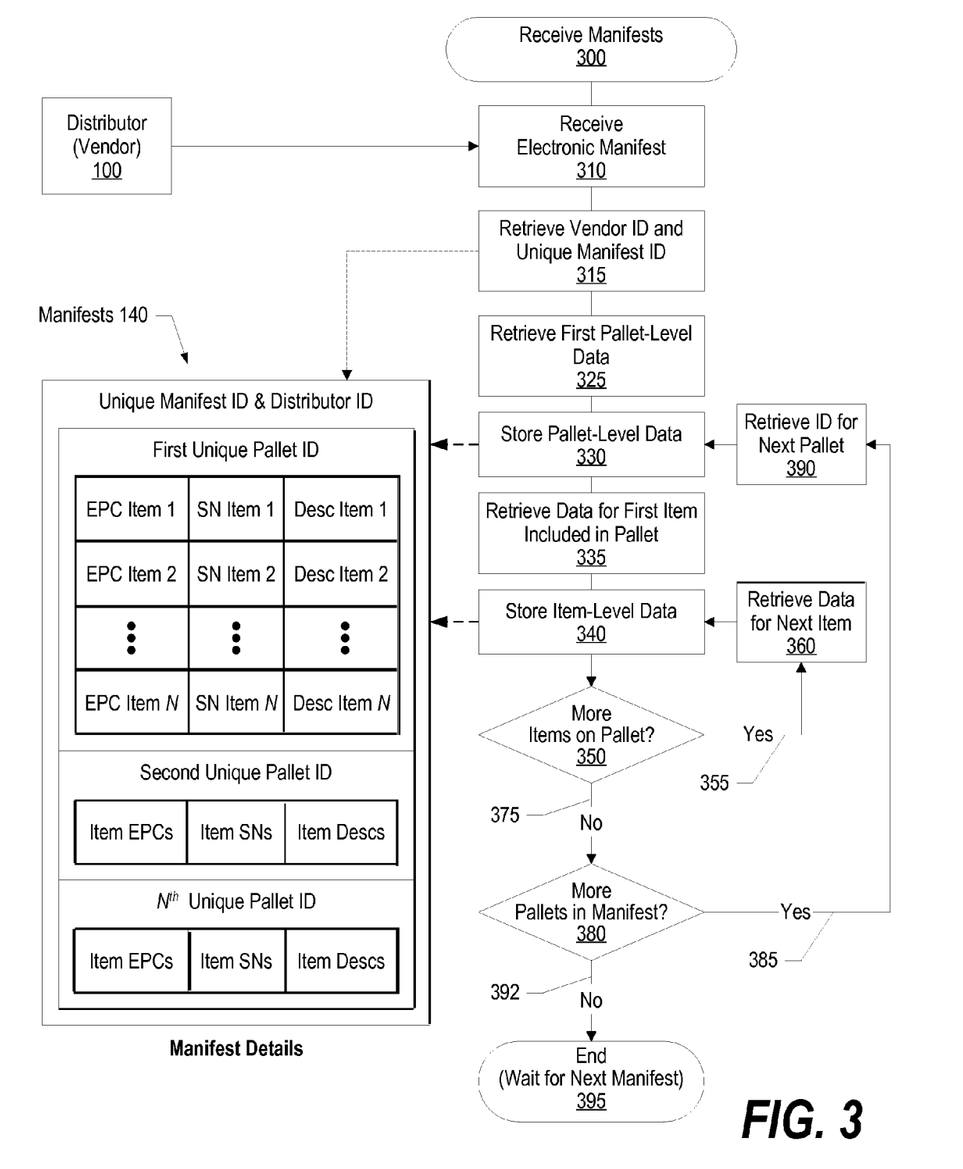
FIG. 3 is a flowchart showing the steps taken to receive and store data from an electronic manifest before the physical goods arrive.

FIG. 3 is a flowchart showing the steps taken to receive and store data from an electronic manifest before the physical goods arrive. Processing commences at 300 whereupon, at step 310, the receiver receives electronic manifest 140 from distributor 100. In one embodiment, the manifest is sent over a public network, such as the Internet. The contents of the manifest can be encrypted depending on the sensitivity of the manifest. If the manifest was encrypted, the receiver decrypts the encrypted manifest based on the type of encrypting using known encryption/decryption algorithms. Steps 315 through 390 detail processes for reading and processing the data in the electronic manifest which would be used if the electronic manifest that was received is in a different format than that used by the receiver. If the format of the received electronic manifest is the same as that used by the receiver, then the received manifest could simply be stored in a data store accessible by the receiver's computer system.

At step 315, the distributor (e.g., vendor) identifier is retrieved along with a unique manifest identifier assigned by the distributor (vendor). In addition, the receiver may generate and store a second unique manifest identifier used by the receiver's processes. The manifest details pallets and items sent from the vendor to the receiver. At step 325, data corresponding to the first pallet in the manifest is retrieved. Pallet data includes the pallet-level RFID tag data (i.e., the data that was encoded on the physical RFID tag that was affixed to the pallet). This includes a pallet-level identifier that uniquely identifies the pallet. At step 330, the pallet data is stored in a data store accessible to the receiver's computer system. At step 335, data corresponding to the first item listed in the manifest for the selected pallet is retrieved. In one embodiment, items are listed in the manifest by pallet so that data for the first pallet's items is retrieved before data is retrieved for the second and subsequent pallets' items. At step 340, the item data is stored in the data store. Some manifest details are shown in manifest 140. For example, each pallet is shown with a unique identifier and each item is shown with an electronic product code (EPC), a serial number (if applicable), and a description.

A determination is made as to whether there are more items on the pallet that need to be read (decision 350). If there are more items on the pallet, decision 350 branches to "yes" branch 355 whereupon, at step 360, data is retrieved for the next item in the pallet and processing loops back to store the data in the data store. This looping continues until all items included on the pallet have been processed, at which time decision 350 branches to "no" branch 375. A determination is then made as to whether there are more pallets to process in the manifest (decision 380). If there are more pallets listed in the manifest, decision 380 branches to "yes" branch 385 whereupon, at step 390, the next pallet-level identifier is retrieved from the manifest and processing loops back to store the pallet-level data and retrieve and store the item-level data corresponding to the pallet. This looping continues until all pallets listed in the manifest have been processed, at which time decision 380 branches to "no" branch 392 and processing ends at 395.

Figure 4:
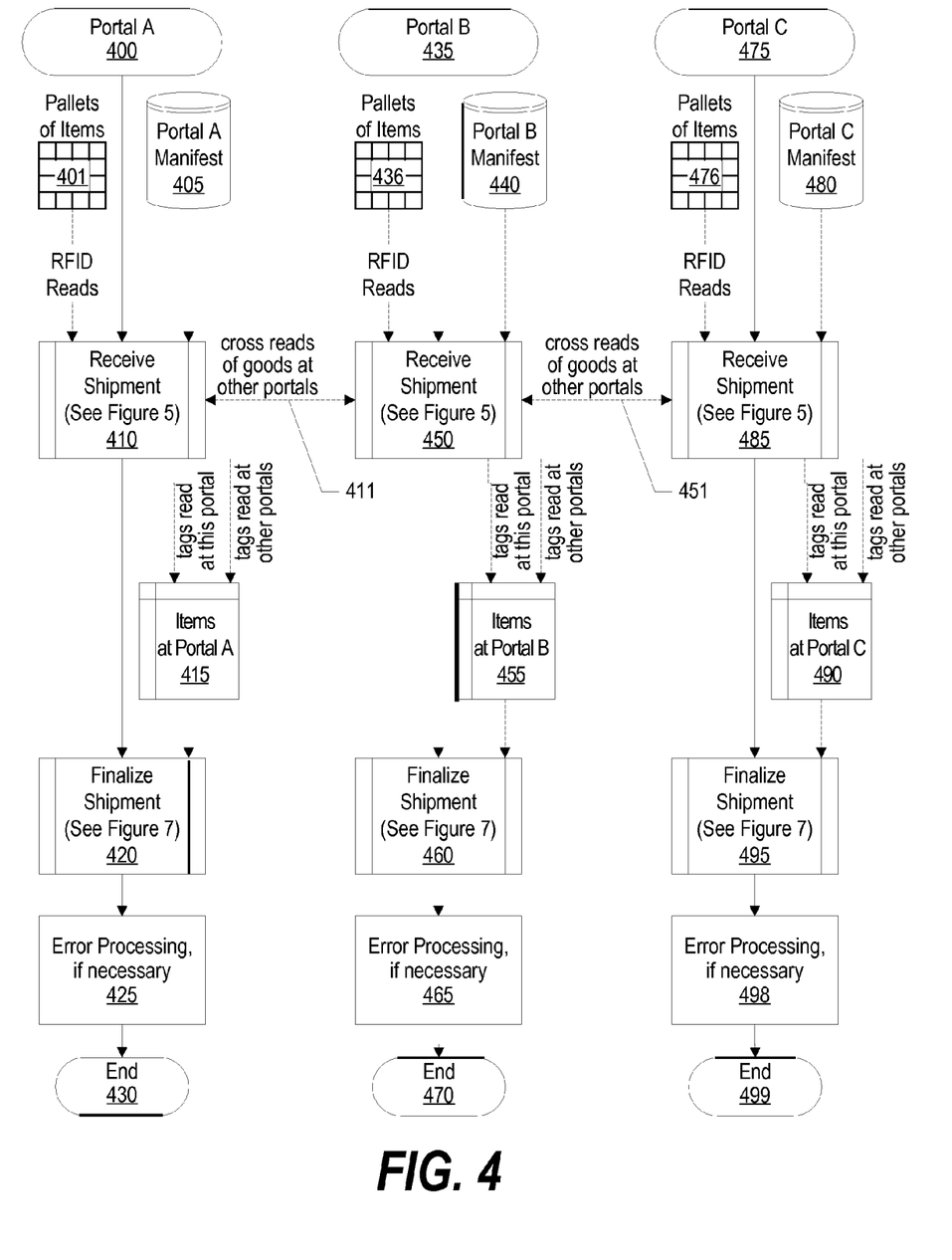
FIG. 4 shows three flowcharts of cross-reads being handled by three different portals (RFID readers)

FIG. 4 shows flowcharts of cross-reads being handled by three different portals (Portal A, Portal B, and Portal C). As previously described, an area where goods arrive and RFID tags are read, such as a dock door equipped with an RFID reader, is referred to as a "portal." Processing for Portals A, B, and C commences at 400, 435, and 475, respectively. In the example shown, a different pallet is being received at each portal. Portal A is receiving pallet 401, Portal B is receiving pallet 436, and Portal C is receiving pallet 475. In addition, each portal checks its respective pallet against a manifest (manifest 405 corresponding to Portal A, manifest 440 corresponding to Portal B, and manifest 480 corresponding to Portal C). A predefined process is used to process the various shipments (predefined process 410 used to receive the shipment at Portal A, predefined process 450 used to receive the shipment at Portal B, and predefined process 485 used to receive the shipment at Portal C). The steps for the predefined processes are the same (see FIG. 5 and corresponding text for processing details). However, in one embodiment, a separate process is started to handle each portal. Dataflows 411 and 451 show cross-read tag data being sent from one process to another. While Portal A and Portal C do not have a dataflow connecting them, data can also flow between these portals as well.

A data store, such as a memory area, stores the items at a particular portal. Memory area 415 stores data read by the RFID reader at Portal A as well as RFID tag data read at other portals but recognized as belonging to Portal A. Likewise, memory area 455 stores data read by the RFID reader at Portal B as well as RFID tag data read at other portals but recognized as belonging to Portal B, and memory area 490 stores data read by the RFID reader at Portal C as well as RFID tag data read at other portals but recognized as belonging to Portal C. When goods are finished being unloaded at a portal, a Finalize Shipment process executes to determine if items are missing. Predefined process 420 finalizes the shipment at Portal A, predefined process 460 finalizes the shipment at Portal B, and predefined process 495 finalizes the shipment at Portal C. The steps for the predefined processes are the same (see FIG. 7 and corresponding text for processing details). However, in one embodiment, a separate process is started to handle each portal. After Finalize Shipment processing as taken place, discrepancies between the respective manifest and the pallets and items received at Portals A, B, and C are handled by error processing (steps 425, 465, and 498, respectively). Processing of the shipments at Portal A, B, and C then ends at 430, 470, and 499, respectively.

Figure 5:
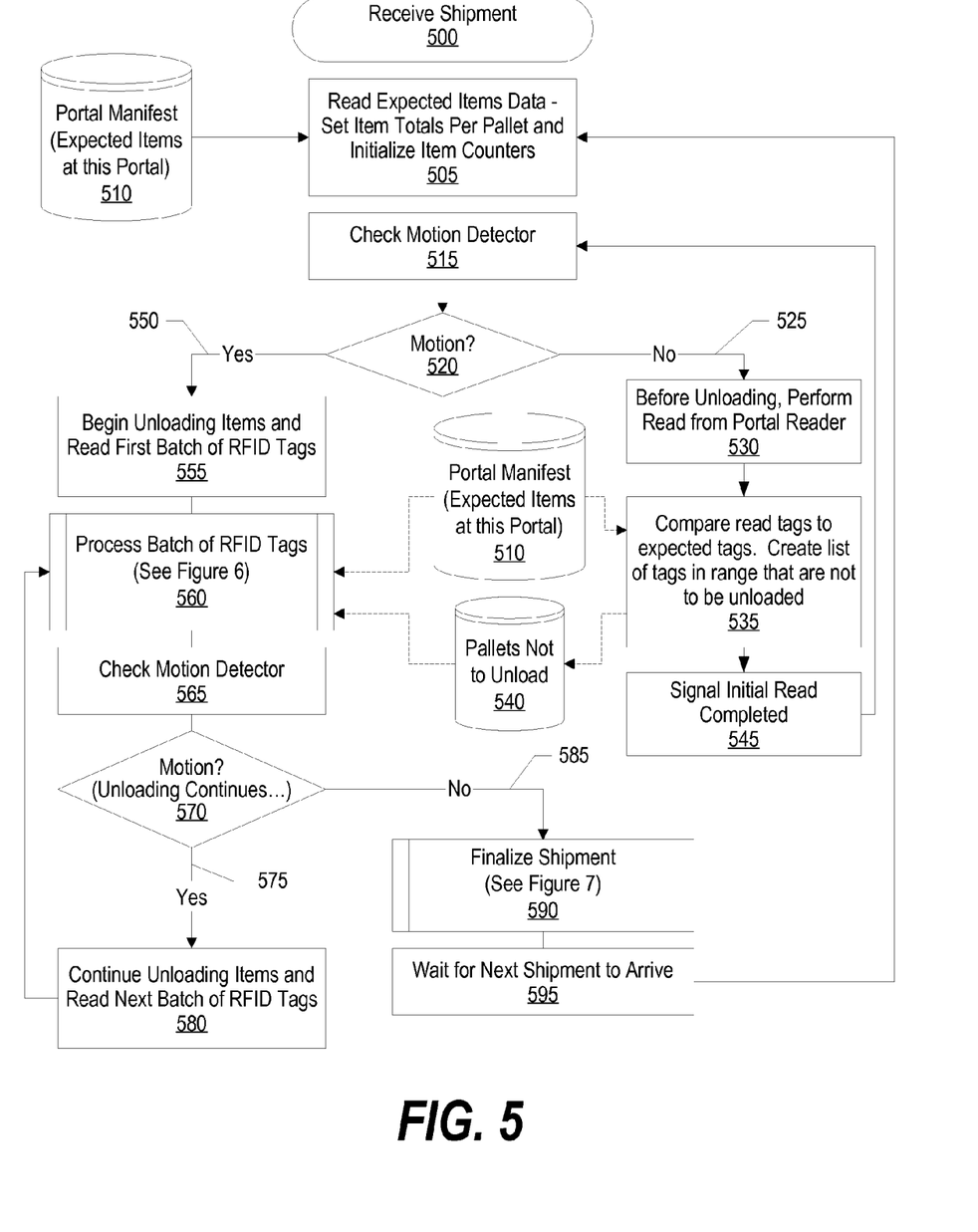
FIG. 5 is a flowchart showing the steps taken to receive a shipment of goods with affixed RFID tags.

FIG. 5 is a flowchart showing the steps taken to receive a shipment of goods with affixed RFID tags. In one embodiment, a separate instance of the process shown in FIG. 5 is launched for each portal that is receiving shipments. Processing commences at 500 whereupon, at step 505, the expected pallet and item data expected at this portal is read from manifest 510. In addition, certain values are initialized. The amount of items expected for each pallet are either retrieved or calculated. In addition, counters that keep track of the number of items received for each pallet are initialized (e.g., set to zero (0)), and flags that track whether each pallet and item have been received are initialized to "no" (indicating that nothing has been received yet).

At step 515, a motion detector at the portal is checked. Prior to unloading the shipment, the operator(s) open the cargo (e.g., semi truck) doors and stop activity in order for the motion detector to detect no motion. In an alternate embodiment, the operator can press a switch or button to signal that a shipment is about to be unloaded to avoid using the motion detectors. A determination is made as to whether motion is detected (decision 520). When no motion is detected, decision 520 branches to "no" branch 525 to perform an initial read using the RFID reader (step 530). This initial read detects whatever RFID tags that can be read with the cargo doors open, including some pallet-level RFID tags at the back of the truck or cargo carrier. At step 535, the RFID tag data read during the initial read are compared with the expected tags in order to create a list of tags that were read by the RFID reader but are not on the manifest. A list of pallets that are not to be unloaded is created and stored in data store 540. At this point (step 545), the initial read is complete and processing loops back to start unloading the shipment.

Returning to step 515, the motion detector is checked and, at decision 520, if there is motion (indicating that the shipment is being unloaded), decision 520 branches to "yes" branch 550 for unloading processing. At step 555, the operators begin unloading pallets of items and the RFID reader continually scans for RFID tags. After the RFID reader scans for RFID tags, tag data for any tags within range of the RFID reader are stored in a memory and are processed (predefined process 560, see FIG. 6 and corresponding text for processing details). After the batch of RFID tags has been processed, at step 565 the motion detector is again checked to see if the shipment is still being unloaded. A determination is made as to whether motion was detected by the motion detector (decision 570). If motion was detected, decision 570 branches to "yes" branch 575 whereupon, at step 580, operators continue to unload pallets from the shipment and processing loops back to process the next batch of RFID tags read by the RFID reader.

Unloading and processing batches of RFID tags continues until motion is no longer detected, indicating that unloading of the shipment has completed, at which point decision 570 branches to "no" branch 585. When unloading is complete, the shipment is finalized (predefined process 590, see FIG. 7 and corresponding text for processing details), and then processing waits for the next shipment to arrive for unloading (step 595). When the next shipment arrives, processing loops back to step 505 to read the next manifest and initialize the counters and flags.

Figure 6:
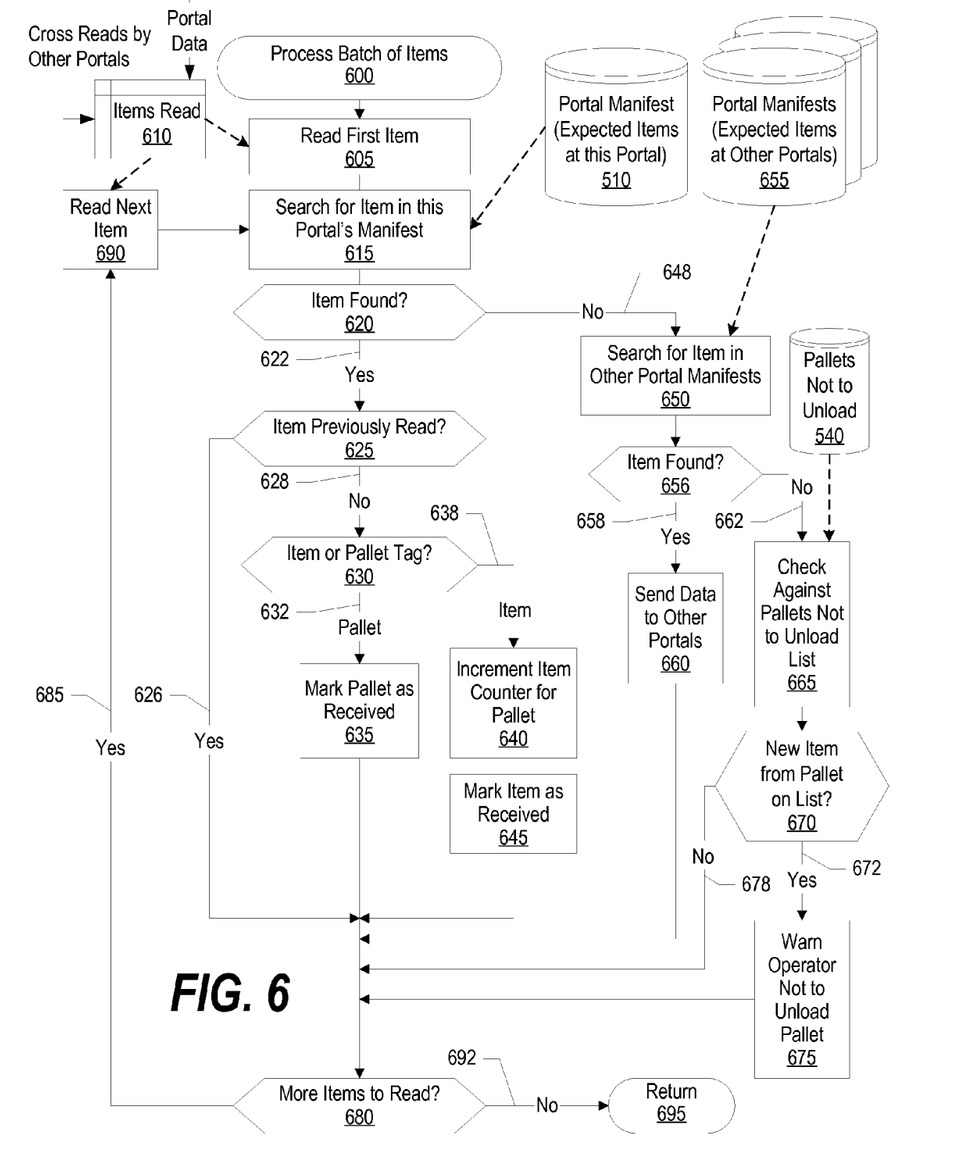
FIG. 6 is a flowchart showing the steps taken to process a batch of RFID tags read during the receiving process.

FIG. 6 is a flowchart showing the steps taken to process a batch of RFID tags read during the receiving process. Processing commences at 600 whereupon, at step 605, the first item is read from items read memory 610. As shown, the items read memory includes both RFID tags read by this portal's RFID reader as well as cross-read RFID tags read by other RFID readers. In one embodiment, the items read data memory is one memory area, while in another embodiment, the items read memory includes one memory area for the RFID tag data read by this portal's RFID reader and one or more memory areas for cross-read RFID tag data (e.g., one memory area can be used for all portals to store cross-read RFID tag data or a separate memory area can be allocated for each portal for storing that portal's cross-read RFID tag data). At step 615, the identifier corresponding to the item that was just read is used to search portal manifest 510 (e.g., the pallets and items expected to arrive at this portal).

A determination is made as to whether the RFID tag that was just read was found in portal manifest 510 (decision 620). If the RFID tag was found, decision 620 branches to "yes" branch 622 whereupon a determination is made as to whether the RFID tag was read during a previous read by the RFID reader and has already been marked as being received (decision 625). If the item has already been read, decision 625 branches to "yes" branch 626 to bypass steps 630 through 645. On the other hand, if this is the first time that this RFID tag has been read by the reader, decision 625 branches to "no" branch 628 whereupon A determination is made as to whether the RFID tag is a pallet-level RFID tag or an item-level RFID tag. If the tag is a pallet-level tag, decision 630 branches to "pallet" branch 632 whereupon, at step 635, the data record in the manifest corresponding to the pallet is marked as received. If the tag is an item-level tag, decision 630 branches to "item" branch 638 whereupon, at step 640, the item counter (indicating the number of items received for this pallet) is incremented, and at step 645, the item is marked as received in the manifest.

Returning to decision 620, if the pallet or item tag is not found in portal manifest 510, decision 620 branches to "no" branch 648 whereupon, at step 650, the manifests corresponding to other portals (data stores 655) are searched for the RFID tag that was just read. A determination is made as to whether the item or pallet tag was found in one of the other portals' manifests indicating that the item is likely being unloaded at a nearby portal (decision 656). If the item was found on another portal's manifest (indicating a cross-read), decision 656 branches to "yes" branch 658 whereupon, at step 660, the cross-read RFID tag data is sent to one or more other portals for processing. On the other hand, if the item was not found on another portal's manifest, decision 656 branches to "no" branch 662 whereupon, at step 665, the pallets not to be unloaded are checked (data store 540) to determine if the RFID tag is a pallet- or item-level RFID tag of an item that should not be unloaded (e.g., an pallet or item on a truck destined to be received by another customer). A determination is made as to whether the item or pallet tag was previously read during the initial read (decision 670). If the pallet or item level tag was not read during the initial read and the item is not on any of the portal manifests, then decision 670 branches to 672, whereupon, at step 675 the operator is warned that a pallet (or item) may be in the process of being unloaded that should remain on the truck. On the other hand, if the RFID tag was read during the initial read by the RFID reader (when the motion sensor detected no motion), then decision 670 branches to "no" branch 678 bypassing step 675.

A determination is made as to whether there are more items to process that were stored in the items read memory area (decision 680). If there are more items to process, then decision 680 branches to "yes" branch 685 whereupon, at step 690, data for the next item is read from items read memory area 610 and processing loops back to process the newly read item. This looping continues until all entries in items read memory area 610 have been read, at which time decision 680 branches to "no" branch 692 and processing returns at 695.

Figure 7:
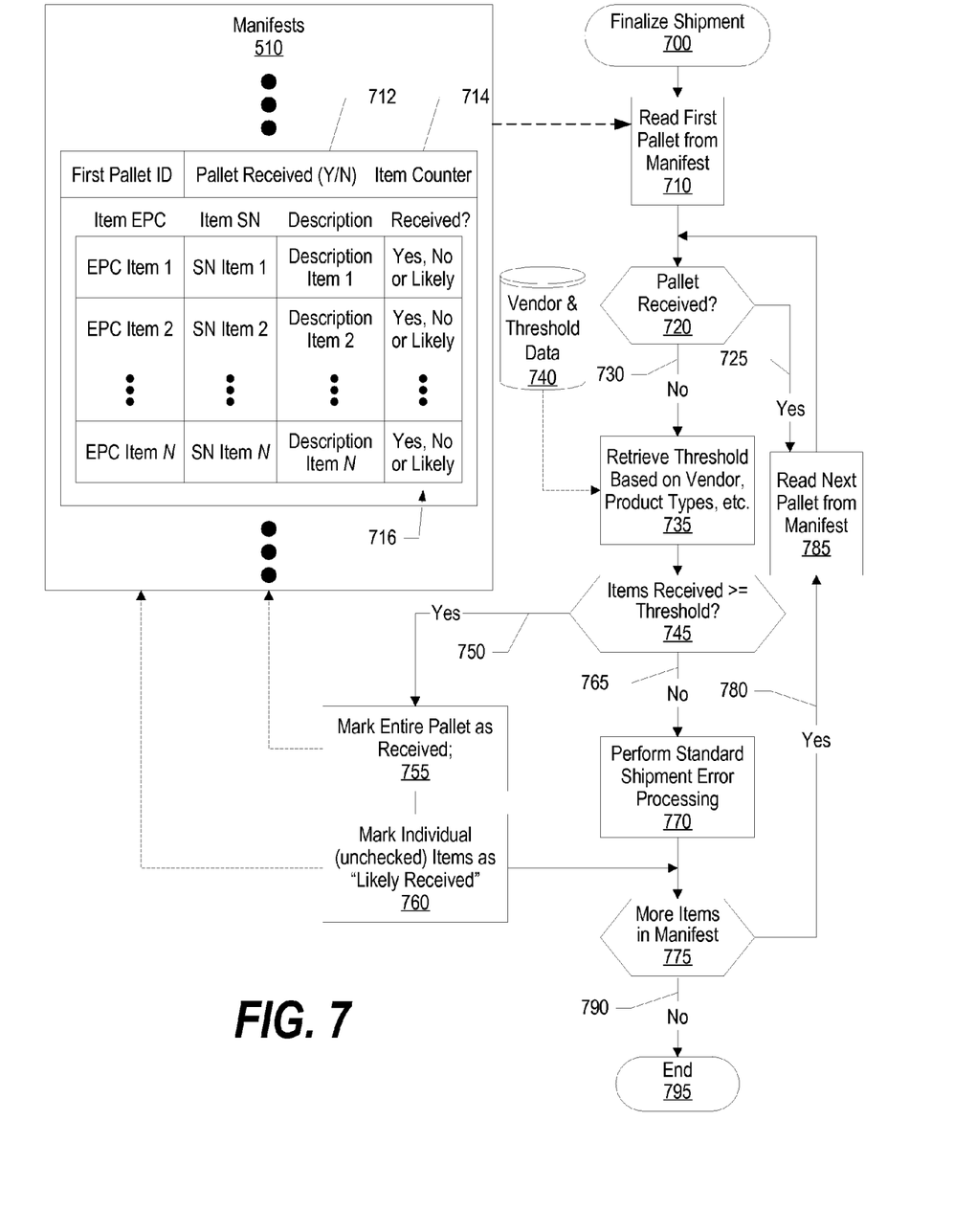
FIG. 7 is flowchart of the steps taken to finalize a shipment that is being received.

FIG. 7 is flowchart of the steps taken to finalize a shipment that is being received. After the shipment has been unloaded, manifest 510 will reflect the pallets and individual items whose RFID tags were read by the RFID readers. Fields were added to manifest 510 to store tracking information that was updated when the shipment was unloaded. These fields include pallet received flag 712, item counter 714, and item received flag 716. Pallet received flag 712 was initialized as "no" for each pallet prior to unloading the shipment. When the RFID reader read one of the pallet-level RFID tags, the corresponding record was marked as "yes" indicating that the pallet was received. Likewise, item received flag 716 was initialized as "no" for each item prior to unloading the shipment. When the RFID reader read one of the item-level RFID tags, the corresponding record was marked as "yes" indicating that the item was received. Item counter 714 was initialized to zero for each pallet prior to unloading the shipment. When the RFID reader read one of the item-level RFID tags belonging to the pallet, the pallet's item counter was incremented keeping track of the number of items that were read for each pallet.

After shipment unloading has stopped, the processing shown in FIG. 7 commences at 700 whereupon, at step 710, the first pallet-level record is read from portal manifest 510. A determination is made as to whether the pallet was marked as being received during unloading of the shipment (decision 720). If the pallet was marked as being received, decision 720 branches to "yes" branch 725 whereupon, at step 785, the next pallet-level record is read from the manifest and processing loops back to process the newly read pallet-level record. On the other hand, if the pallet was not marked as being received during unloading, decision 720 branches to "no" branch 730 in order to try to determine whether the pallet was actually received but the pallet-level RFID tag was simply not read (e.g., the pallet-level tag was missing, damaged, or otherwise unable to be read by the RFID reader during the unloading operation).

At step 735, vendor and other threshold data is read from vendor and threshold data store 740. Based on past experience, a vendor with a good history of accurately shipping goods can have a low threshold (e.g., 50%) and a vendor with a poor history can have a higher threshold (e.g., 75%) established. The threshold determines how many individual items listed in the manifest as belonging to the pallet need to be read by the RFID reader in order to assume that the entire pallet was received. In lieu of vendor ratings, or in conjunction with such ratings, product type ratings can be established and stored in data store 740. For example, some items, such as metal beverage cans, act as insulators and make it difficult for RFID readers to read attached RFID tags. If product type ratings are used, some product types that are difficult to read due to item characteristics may have a lower threshold established (e.g., 40%), while a product type that is does not interfere with the RFID reader's ability to read RFID tags can have a higher threshold established (e.g., 80%). In addition, vendor ratings and product type ratings can be combined in numerous ways. For example, a vendor with a can have its threshold reduced when the pallet contains difficult to read items (e.g., subtract 25% giving a threshold of 25% (50%-25%) for higher quality vendor and a threshold of 50% for the poorer quality vendor (75%-25%)). Likewise, when the pallet contains easy to read items, the vendor thresholds can be left alone or have percentages added to the vendor threshold for an ultimate threshold.

Item counter 714 is read and evaluated using the retrieved threshold data and a determination is made as to whether the number of items received meets or exceeds the threshold that was set (decision 745). For example, if a pallet included 40 items and the threshold was 50%, then if 20 or greater individual items were marked as "received," then the pallet would be assumed to have been received. However, if fewer than 20 items were received, then the pallet would not be assumed to have been received. If the number of items meets or exceeds the threshold, then decision 745 branches to "yes" branch 750 whereupon, at step 755, the entire pallet is marked as "received" (field 712 is marked as "yes" for received). At step 760, the items in the pallet that were not already marked as being received during the unloading operation are marked as "likely received" using field 716. In this manner, subsequent analysis can distinguish between items with tags that were actually read by the RFID reader and those items that were assumed to have been received. Returning to decision 745, if the number of items received for a pallet does not meet or exceed the threshold, then decision 745 branches to "no" branch 765 whereupon, at step 770, shipment error processing is performed to determine, often manually, whether the pallet was actually received.

After the pallet has been processed, a determination is made as to whether there are more pallet-level records in manifest 510 to process (decision 775). If there are more pallet-level records to process, decision 775 branches to "yes" branch 780 whereupon, at step 785, the next pallet-level record is read from the manifest and processing loops back to process the newly read pallet-level record. This looping continues until all pallet-level records in the manifest have been read, at which time decision 775 branches to "no" branch 790 and processing ends at 795.

Figure 8:
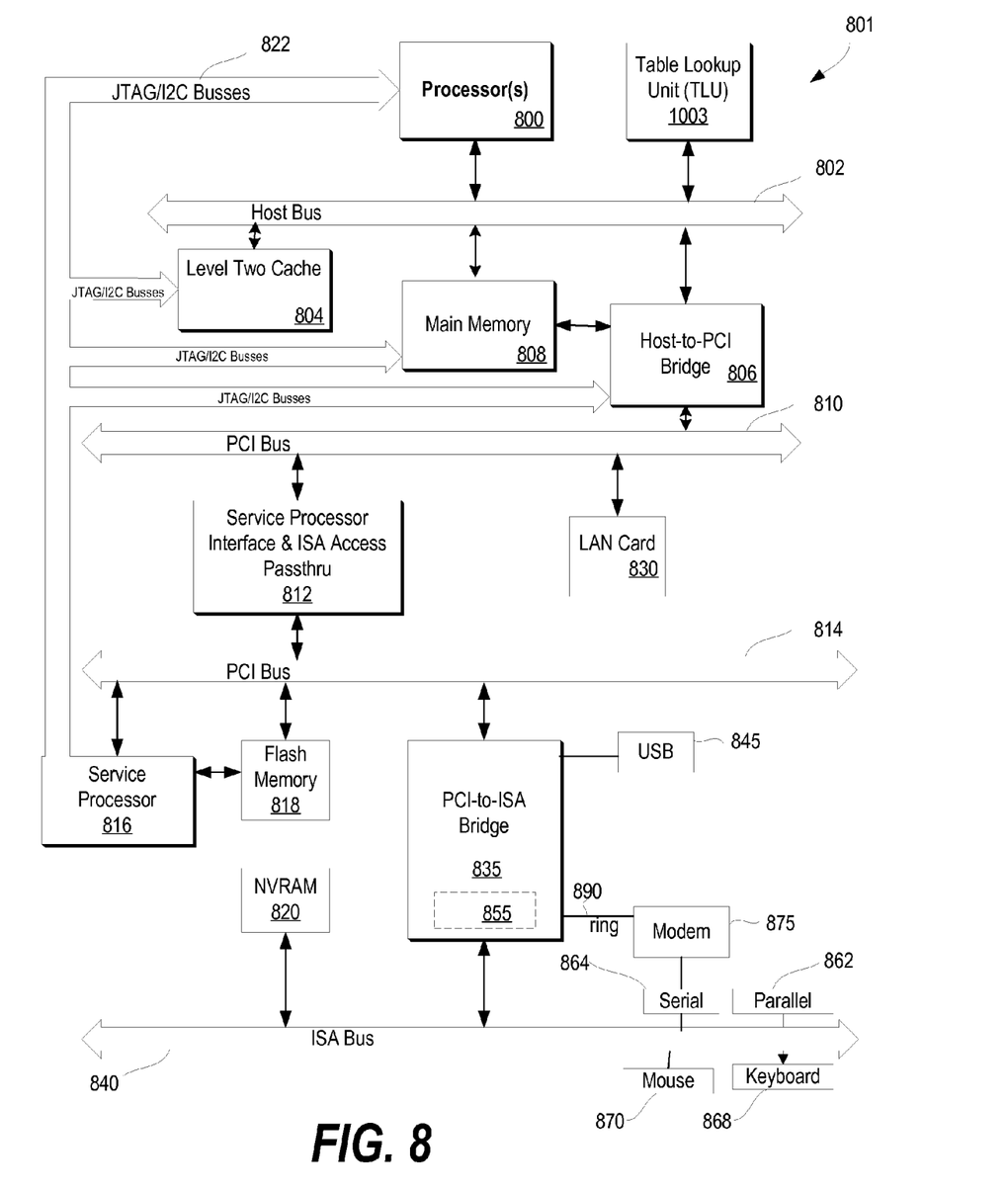
FIG. 8 is a block diagram of an information handling system in which the processes described herein may be implemented.

FIG. 8 illustrates information handling system 801 which is a simplified example of a computer system capable of performing the computing operations described herein. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 875 is connected to serial port 864 and PCI-to-ISA Bridge 835.

While the computer system described in FIG. 8 is capable of executing the processes described herein, this computer system is simply one example of a computer system. Those skilled in the art will appreciate that many other computer system designs are capable of performing the processes described herein.

One of the preferred implementations of the invention is a software program, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented on a computer readable medium as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for swapping tag information, said method comprising:

first reading, using a first software process, a first plurality of radio frequency identifiers corresponding to a first plurality of objects, the first reading performed at a first portal by a first RFID reader, wherein the first reading is performed while unloading the first plurality of objects;

retrieving a first manifest data corresponding to the first plurality of objects, the first manifest data including a first plurality of expected identifiers corresponding to a first plurality of objects expected to be received at the first portal;

first comparing the first plurality of expected identifiers to the first plurality of radio frequency identifiers read by the first RFID reader;

second reading, using a second software process, a second plurality of radio frequency identifiers corresponding to a second plurality of objects, the second reading performed at a second portal by a second RFID reader, wherein the second reading is performed while unloading the second plurality of objects;

retrieving a second manifest data corresponding to the second plurality of objects, the second manifest data including a second plurality of expected identifiers corresponding to a second plurality of objects expected to be received at the second portal;

second comparing the second plurality of expected identifiers to the second plurality of radio frequency identifiers read by the second RFID reader;

first identifying, based on the first comparison, one or more of the first plurality of expected identifiers that are not included in the first plurality of radio frequency identifiers, the first identifying resulting in one or more missing identifiers;

second identifying, based on the second comparison, one or more of the second plurality of radio frequency identifiers that are not included in the second plurality of expected identifiers, the second identifying resulting in one or more extra identifiers;

third comparing the one or more extra identifiers with the one or more missing identifiers;

third identifying, based on the third comparison, one or more cross-read identifiers corresponding to one or more objects being unloaded at the first portal with radio frequency identifiers that were read by the second portal's RFID reader;

adding the cross-read identifiers to the first plurality of radio frequency identifiers; and removing the cross-read identifiers from the second plurality of radio frequency identifiers.

2. An information handling system comprising:

one or more processors;

a memory accessible by at least one of the processors;

a nonvolatile storage area accessible by at least one of the processors;

a plurality of radio frequency identification (RFID) readers that read radio frequency identifiers; and a set of instructions stored in the memory, wherein one or more of the processors executes the set of instructions in order to perform actions comprising:

first reading, using a first software process, a first plurality of radio frequency identifiers corresponding to a first plurality of objects, the first reading performed at a first portal by a first RFID reader, wherein the first reading is performed while unloading the first plurality of objects;

retrieving a first manifest data corresponding to the first plurality of objects, the first manifest data including a first plurality of expected identifiers corresponding to a first plurality of objects expected to be received at the first portal;

first comparing the first plurality of expected identifiers to the first plurality of radio frequency identifiers read by the first RFID reader;

second reading, using a second software process, a second plurality of radio frequency identifiers corresponding to a second plurality of objects, the second reading performed at a second portal by a second RFID reader, wherein the second reading is performed while unloading the second plurality of objects;

retrieving a second manifest data corresponding to the second plurality of objects, the second manifest data including a second plurality of expected identifiers corresponding to a second plurality of objects expected to be received at the second portal;

second comparing the second plurality of expected identifiers to the second plurality of radio frequency identifiers read by the second RFID reader;

first identifying, based on the first comparison, one or more of the first plurality of expected identifiers that are not included in the first plurality of radio frequency identifiers, the first identifying resulting in one or more missing identifiers;

second identifying, based on the second comparison, one or more of the second plurality of radio frequency identifiers that are not included in the second plurality of expected identifiers, the second identifying resulting in one or more extra identifiers;

third comparing the one or more extra identifiers with the one or more missing identifiers;

third identifying, based on the third comparison, one or more cross-read identifiers corresponding to one or more objects being unloaded at the first portal with radio frequency identifiers that were read by the second portal's RFID reader;

adding the cross-read identifiers to the first plurality of radio frequency identifiers; and removing the cross-read identifiers from the second plurality of radio frequency identifiers.

3. A computer program product stored in a computer readable medium, comprising functional descriptive material that, when executed by a data processing system, causes the data processing system to perform actions comprising:

first reading, using a first software process, a first plurality of radio frequency identifiers corresponding to a first plurality of objects, the first reading performed at a first portal by a first RFID reader, wherein the first reading is performed while unloading the first plurality of objects;

retrieving a first manifest data corresponding to the first plurality of objects, the first manifest data including a first plurality of expected identifiers corresponding to a first plurality of objects expected to be received at the first portal;

first comparing the first plurality of expected identifiers to the first plurality of radio frequency identifiers read by the first RFID reader;

second reading, using a second software process, a second plurality of radio frequency identifiers corresponding to a second plurality of objects, the second reading performed at a second portal by a second RFID reader, wherein the second reading is performed while unloading the second plurality of objects;

retrieving a second manifest data corresponding to the second plurality of objects, the second manifest data including a second plurality of expected identifiers corresponding to a second plurality of objects expected to be received at the second portal;

second comparing the second plurality of expected identifiers to the second plurality of radio frequency identifiers read by the second RFID reader;

first identifying, based on the first comparison, one or more of the first plurality of expected identifiers that are not included in the first plurality of radio frequency identifiers, the first identifying resulting in one or more missing identifiers;

second identifying, based on the second comparison, one or more of the second plurality of radio frequency identifiers that are not included in the second plurality of expected identifiers, the second identifying resulting in one or more extra identifiers;

third comparing the one or more extra identifiers with the one or more missing identifiers;

third identifying, based on the third comparison, one or more cross-read identifiers corresponding to one or more objects being unloaded at the first portal with radio frequency identifiers that were read by the second portal's RFID reader;

adding the cross-read identifiers to the first plurality of radio frequency identifiers; and removing the cross-read identifiers from the second plurality of radio frequency identifiers.

* * * * *